US006956588B2

(12) United States Patent
Hernandez, III

(10) Patent No.: US 6,956,588 B2
(45) Date of Patent: Oct. 18, 2005

(54) LIAISON TECHNOLOGY TO CONNECT PLURAL END USER DEVICES TO AN INTERFACE FOR A COMPUTING RESOURCE HAVING ONE PORT ASSIGNED TO THE INTERFACE

(75) Inventor: Gasper Hernandez, III, Andover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 510 days.

(21) Appl. No.: 09/783,979

(22) Filed: Feb. 16, 2001

(65) Prior Publication Data

US 2001/0034804 A1 Oct. 25, 2001

Related U.S. Application Data

(63) Continuation-in-part of application No. 09/407,878, filed on Sep. 29, 1999.

(51) Int. Cl.[7] .............................................. G09G 5/00
(52) U.S. Cl. ........................ 345/650; 710/72; 710/236; 710/306
(58) Field of Search ................. 345/650, 1.1; 395/821; 202/229; 710/72, 236, 129, 15, 17

(56) References Cited

U.S. PATENT DOCUMENTS

| | | | | |
|---|---|---|---|---|
| 4,794,520 A | * | 12/1988 | Kobus, Jr. et al. | 710/107 |
| 5,220,663 A | * | 6/1993 | Bauchot et al. | 714/56 |
| 5,235,592 A | * | 8/1993 | Cheng et al. | 370/451 |
| 5,367,646 A | * | 11/1994 | Pardillos et al. | 710/63 |
| 5,619,722 A | * | 4/1997 | Lovrenich | 710/2 |
| 5,991,830 A | * | 11/1999 | Beard et al. | 710/18 |
| 6,240,472 B1 | * | 5/2001 | Hu | 710/72 |
| 6,282,586 B1 | * | 8/2001 | Bullough | 710/18 |
| 6,295,519 B1 | * | 9/2001 | Wagner et al. | 703/25 |
| 6,363,081 B1 | * | 3/2002 | Gase | 370/466 |

\* cited by examiner

Primary Examiner—Guy Lamarre
Assistant Examiner—Fritz Alphonse

(57) ABSTRACT

A port-multiplexed system (and associated method and software) are disclosed. Such a system includes: a computing resource having a port; a monitoring interface to the computing resource available via the port; plural end user devices to be connected to the monitoring interface; and a liaison interface to multiplex the plurality of end user devices to the monitoring interface via the port. The computing resource can be a mobile switching center and the monitoring interface can be configured to obtain status display pages (SDPs).

25 Claims, 6 Drawing Sheets

LIAISON TECHNOLOGY TO CONNECT PLURAL END USER DEVICES TO AN INTERFACE FOR A COMPUTING RESOURCE HAVING ONE PORT ASSIGNED TO THE INTERFACE

CONTINUATION INFORMATION

This application is a Continuation-In-Part (CIP) of U.S. patent application Ser. No. 09/407,878, filed Sep. 29, 1999, the entirety of which is hereby incorporated by reference.

FIELD OF THE INVENTION

The invention is directed toward interfacing computer systems, and more particularly to a liaison technology between plural end user devices and an interface for a computing resource having one port assigned to the interface.

BACKGROUND OF THE INVENTION

Large systems often include monitoring subsystems (interfaces) that permit one or more operators to monitor one or more parameters of the system in general, and to specifically monitor the state of one or more parameters of the large system.

An example of such a monitoring subsystem is the AUTOPLEX® Maintenance CRT (MCRT) monitoring system marketed by Lucent Technologies Inc. as a tool for use with its various wireless telephony systems, e.g., a main switching center (MSC). The AUTOPLEX® MCRT monitoring system include user interfaces (e.g., the Status Display Page (SDP) interface) by which an operator can input a request for information representing one or more parameters that are indicative of the operational state of the wireless telephony system. In response, the AUTOPLEX® MCRT monitoring system displays the desired information on a video screen. As the capabilities of the AUTOPLEX® MCRT monitoring system have grown, so has the amount of information that it can display per screen.

A typical display screen partitions the viewing area into regions that have a predefined association with a parameter. The combination of attributes of a region is understood to be an indicator of the characteristics of the parameter. Typical indicator attributes might include an alphanumeric string representing a value, one of two foreground and background color combinations, whether it is blinking or not blinking, and/or whether it is not visible at all. Such a video screen is energized according to a file of non-text, i.e., hexadecimal code, display generation data. A system such as the AUTOPLEX® MCRT monitoring system can be described as a dedicated non-text-variable-output system.

To derive meaning from such a video screen, an operator must be familiar with the predefined associations. Otherwise, the video screen appears merely to be an array of variously-colored alphanumeric strings, some of which might be blinking.

Once an operator is familiar with such a video screen, he can submit (among other things) a Status Display Page (SDP) command to the interface to request information about a particular parameter or large system configuration. Then, the operator watches the screen until the requested array of information is displayed. Using his knowledge of the predefined associations for the requested screen, the operator looks to the region that acts as an indicator for the parameter. In that region, the operator observes the alphanumeric string, the combinations of colors and whether or not the combination is blinking, or whether the region is totally blank. In his mind, the operator translates the attributes of the indicator into the characteristics of the indicator. Usually, the characteristics of the indicator are the alphanumeric string and the state, the state being represented by the combination of colors.

To perform this translation requires the operator to recall the predefined associations and/or attribute/characteristic relationships. A typical screen for the SDP command has about 20–30 indicators and there are over 100 screens that can be requested with the SDP command. In addition, the color relationships for an indicator on an SDP screen can change from one software release of the AUTOPLEX® MCRT monitoring system to the next. Thus, there is a great deal of information that an operator must remember about all of the SDP commands.

Sometimes, an operator will change a parameter in the system. There might be a delay between when the operator requests the change and when it takes effect. An operator can confirm that the change has taken effect by monitoring an indicator on an SDP screen. If there is a delay in the change taking effect, then the operator must watch the video screen until the attributes of the corresponding indicator change.

Suppose a parameter is critical to the operation of a component of the wireless telephony system. An operator might be assigned to verify that parameter's state is always acceptable. In theory, this requires the operator to never avert his eyes from the screen. If the appearance of the indicator changes, the operator must recognize the change in appearance and respond accordingly.

When an operator uses such a monitoring subsystem (interface), its complexities and difficulties routinely cause the user to spend a great deal of time connected to it, and therefore indirectly connected to the large system. Much if not most of the connection time is idle, i.e., with no information being passed between the monitoring system and the large system. This is primarily due to the need for the user to analyze the information (received from the monitoring system) before requesting additional information from the monitoring system. As a matter of convenience, users typically do not disconnect from the monitoring system while determining what their next request for information will be (which would otherwise require a reconnection).

A large system such as the MSC will typically have 16 ports available for users to connect to it via the AUTOPLEX® MCRT monitoring system. Once 16 users are connected, the $17^{th}$ cannot connect, i.e., is blocked, until one of the other 16 ends his session with the monitoring system. But typically, there are a great many more than 16 people who wish to be able to use this monitoring system at the same time.

The problem can be solved by adapting the MSC (the large system) to have additional ports that can be made available to the monitoring system. However, such large systems are typically mature products for which research and development efforts have been greatly diminished. This makes such an adaption prohibitively expensive to undertake.

Even if such an adaptation were made, the adaptation would still suffer the problem having a great amount of the processing power of the large system wasted by having to service primarily idle monitoring system connections.

SUMMARY OF THE INVENTION

The invention provides technology, including a method, an apparatus that implements the method, and a computer readable medium bearing a program which causes a computer to implement the method, that can solve the problems discussed above.

The invention is, in part, a recognition, that it is possible to interpose a liaison interface between multiple users of a monitoring system and the monitoring system itself, which does not disturb the existing monitoring system and yet achieves the desired goal of giving each user the impression of having an exclusive direct connection to the monitoring system.

The invention, in part, provides a port-sharing system (and software and method embodied therein), the system comprising: a computing resource having a port; an interface to said computing resource available via said port; a plurality of end user devices to be connected to said interface; and a liaison interface to handle communications from said plurality of end user devices that are intended for said monitoring interface and to handle communications from said monitoring interface that correspond to said communications from said end user devices, respectively.

The invention, also in part, provides a liaison apparatus (and software and method embodied therein) to work with a system having a plurality of end user devices that desire to concurrently interface to a computing resource through a port of the computing resource, the liaison apparatus being interposed between the plurality of end user devices and a monitoring interface for a computing resource made available through the port assigned to the monitoring interface, the apparatus comprising: a front input/output (I/O) unit to communicate with said plurality of end user devices; a back I/O unit to connect to said port of said computing resource; and a liaison unit to handle communications from said plurality of end user devices via said front I/O unit that are intended for said monitoring interface and to handle communications from said monitoring interface via said back I/O unit that correspond to said communications from said end user devices, respectively.

An example of the computing resource is a mobile switching center (MSC). And an example of the interface to the computing resource is a status display page (SDP) interface.

For a computing resource having multiple ports (each port being associated with its own instance of the computing resource's interface), the invention provides (also in part) that multiple liaison interfaces (e.g., handler daemons) can be generated to correspond to the multiple ports, respectively. Accordingly, in this scenario, the plurality of end user devices is but one of multiple sets of a plurality of end user devices, where each liaison interface is operable to handle communications from one of said sets of end user devices that are intended for said monitoring interface and communications from said monitoring interface that correspond to said requests from respective members of said one set of end user devices.

Objectives, features and advantages of the invention will be more fully apparent from the following detailed description of the preferred embodiments, the appended claims and the accompanying drawings.

BRIEF DESCRIPTION OF THE DRAWINGS

The accompanying drawings are intended to depict example embodiments of the invention and should not be interpreted to limit the scope thereof.

DETAILED DESCRIPTION OF THE PREFERRED EMBODIMENTS

Figure 1:
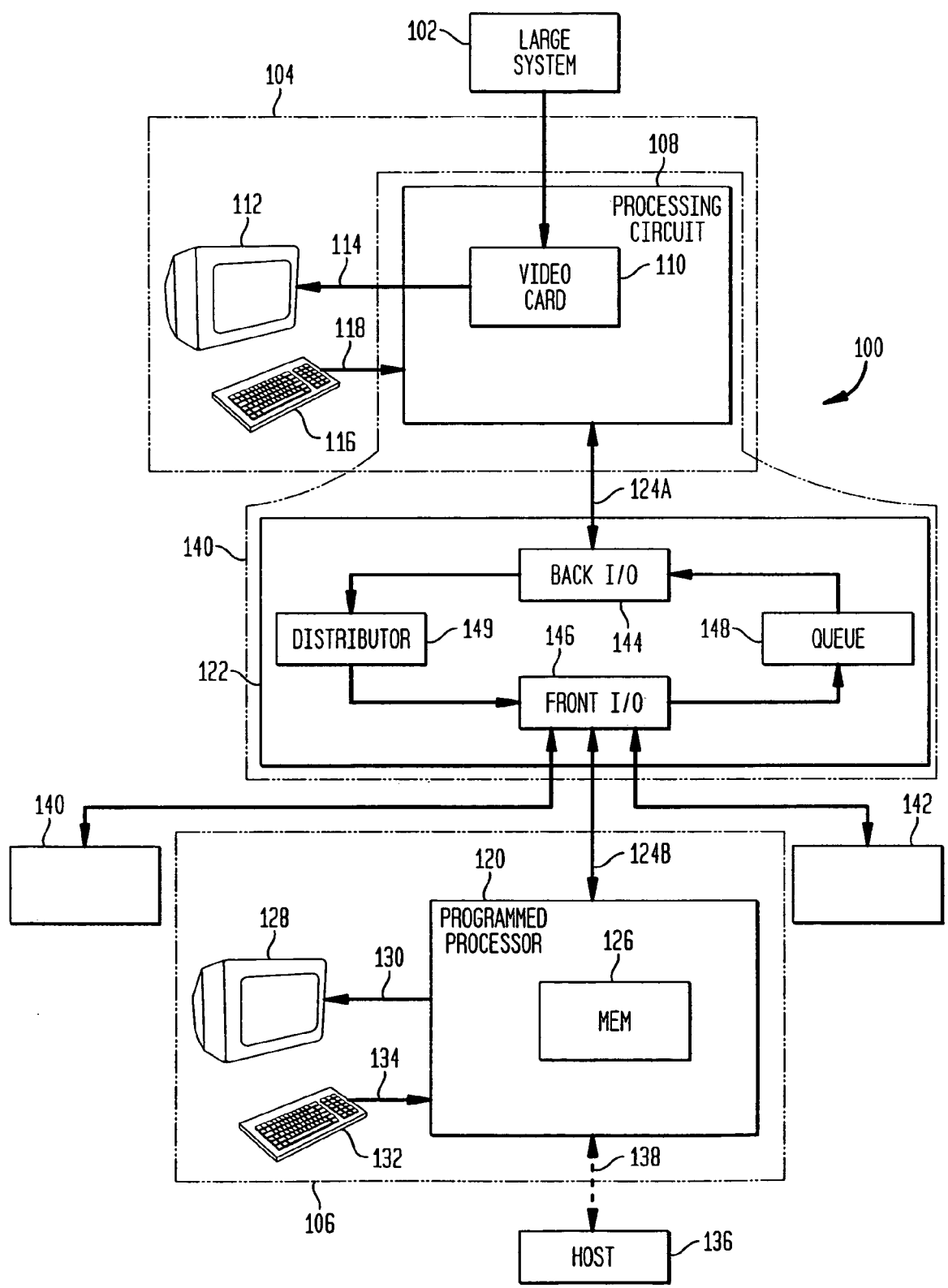
FIG. 1 depicts the system in which the technology according to the invention forms a part.

FIG. 1 depicts an overall system 100 of which the liaison interface 122 according to the invention forms a part. The other parts of the overall system 100 include: clients 106, 140 and 142 that include at least some, if not all, of the translation technology of the parent application; a large system (or computing resource) 102 and the monitoring system 104, examples of which were discussed above in the Background Section. Again, an example of the large system 102 is a wireless telephony system and an example of the monitoring system 104 is the AUTOPLEX® MCRT monitoring system marketed by Lucent Technologies Inc. The monitoring system 104 makes it possible for an operator to input a request for information representing one or more parameters that are indicative of the operational state of the large system.

The monitoring system 104 includes processing circuitry 108, a part of which is a video display driver circuit card 110. The video card 110 drives a video display device (VDD) 112 with non-text, typically hexadecimal code, display-generation data supplied over a connection 114. An input device in the form of a keyboard 116 is connected to the processing circuitry 108 via a signal line 118. The processing circuitry can include a network server.

The clients 106, 140 and 142 can each have the same hardware, which can be the same as for the translation technology disclosed in the parent application. Three clients have been depicted for simplicity, but this number can vary according to the configuration of the liaison interface 122, as will be described below. Also, for visual simplicity, only the client 106 has been depicted in detail.

Each of the clients 106, 140 and 142 should incorporate from the parent application at least the aspect of being able to capture a status display page (SDP), i.e., a file of non-text data, from the AUTOPLEX® MCRT monitoring system.

Optionally, one or more of the clients 106, 140 and 141 can incorporate all aspects of the parent application, especially the non-text data into text variables translation aspect.

A client 106 using the hardware according to the translation technology of the parent application would include a processor 120, an output device in the form of a video display device (VDD) 128 connected via a signal line 130, and an input device preferably in the form of a keyboard 132 connected via a signal line 134. The programmed processor has a memory 126 for storing a program or script that causes the processor 120 to implement the method according to the invention. The processor 120 can communicate with, e.g., an input/output (I/O) port (in the case of the AUTOPLEX® MCRT monitoring system) of the processing circuitry 108 indirectly via the liaison interface 122 according to the invention. The liaison interface 122 communicates with the processing circuitry 108 via the communication path 124A, while the client 106 communicates with the liaison 122 via the communication path 124B.

An embodiment of the liaison interface 122 according to the invention has been written using the Tool Command Language (TCL). The liaison interface 122 can be a stand-alone processor device running an application and one or more daemons on hardware comparable to that of the components of the client 106 (to be discussed below). Such software can be downloaded, and in doing so the computer-readable medium in which the software is embodied takes the form of a propagated signal. Alternatively, a server included in the processing circuitry 108 can generate the liaison interface 122 (e.g., represented by the application and the one or more daemons), as depicted via the dashed line 139.

The computer-readable memory 126 can include RAM, ROM, a fixed hard disk drive, and/or a removable storage medium for a non-fixed disk drive such as a floppy disk or a CDROM. The processor 120 can connect to a remote host 136 over the optional connection 138.

The client 106 performs many sorting and comparison operations as well as accesses to look-up tables (LUTs). As such, the processor 120 should be of sufficient processing power to assure reasonably quick results. Examples of adequate processors are those from the Pentium family of processors marketed by Intel Inc.

The liaison interface 122 can be described as performing primarily four functions: first, interfacing with the plurality of clients 106, 140 and 142; second, interfacing with the monitoring aspect of the processing circuitry (the "monitoring system") 108; third, queuing communications from said plurality of end user devices that are intended for said monitoring interface; and fourth, distributing communications from said monitoring interface that correspond to said communications from said end user devices, respectively. In this application, the third and fourth functions are loosely referred to as multiplexing the monitoring system 108 with the plurality of clients 106, 140 and 142 to connote the relationship of many communicating with one and one communicating with one-of-many, respectively, depending upon the direction of the communications involved.

In FIG. 1, the first function is represented by the front input/output (I/O) unit 146. The second function is represented by the back I/O unit 144. The third function is represented by the queue unit 148. And the fourth function is represented by the distributor unit 149. These units 144, 146, 148 and 149 do not necessarily represent distinct pieces of hardware. Rather, they at least represent some functional aspects of the liaison interface 122.

Again, an example of the wireless telephony system (which itself is an example of a large system) is a Mobile Switching Center (MSC). And again, SDP screens display status information about the MSC's cells. The cost of an MSC is roughly over a million dollars. In a lab environment in which testers need to test every feature an asset of such a wireless system which can support over two hundred cells, the need to access information is great. Unfortunately, only a total of 16 ports are typically available through which to query and view Status Display Pages (SDP) using the AUTOPLEX® MCRT monitoring system. Some of the problems of having only 16 ports are described above.

The queue unit 148 can queue the communications from the clients 106, 140 and 142, i.e., can buffer the communications using, e.g., a first in, first out (FIFO) strategy. But other, more sophisticated queuing strategies that, e.g., weigh a user's ranking or the nature of the information being requested, can be adopted as appropriate. The monitoring system 108 will typically handle only one communication, e.g., information request, at a time. Hence, to distribute the response by the monitoring system 108, the distributor unit 149 merely needs to glean and temporarily store the client's identification information as the client's communication is being provided from the queue unit 148 to the monitoring system 108. The distributor unit 149 then merely uses the temporarily stored information to direct the response from the monitoring system 108 to the corresponding client. Alternatively, the client's identification information could be gleaned from the communication as the communication sits in the "on deck" position in the queue unit 148, i.e., the last stage of the queue unit 148 in which a communication sits before it is sent along to the monitoring system 108.

An example embodiment of the liaison interface 122 according to the invention has been dubbed the Bi-Directional Object-Orientated SDP Sharing (BOSS) tool, which has clients that communicate with a BOSS server tool. The BOSS tools run on a server that can be included as part of the processing circuitry 108. The BOSS tools have been created for the UNIX operating system.

The BOSS tools multiplex SDP screens as described below. This eliminates the need to purchase another MSC simply to obtain more ports. The faster the BOSS server, then the more ports there are which can be multiplexed. With a 4 CPU server, operating at 450 MHZ, in it simplest form the BOSS server tool can supply an additional 16 ports for roughly a cost of forty thousand dollars in capital. The number of clients that the BOSS tool server can accommodate can easily be configured, so, e.g., with a fast server, 64 SDP ports can be easily realized per MSC.

There can be at least four types of BOSS tools: a server control application; a monitoring daemon; a master daemon; and at least one handler daemon. Alternatively, only one of the BOSS tools, namely, one handler daemon, can be present but that arrangement is much less flexible, as will become clear from the discussion below. The control application and the daemons are generated by the hardware of the liaison interface 122.

The term, daemon, is a UNIX term, though many other operating systems provide support for daemon-like processes. For example, the windows operating system refers to daemon-type processes as system agents and services. This document will use daemon to describe a process that performs one or more specified operations in response to certain events and/or at certain times. For example, a daemon can be a program that runs in the background and/or continuously and that exists for the purpose of handling periodic requests that the system is expected to receive. The adaptation of the present invention to other operating systems would be very apparent to one of ordinary skill in the art and amount to an ordinary amount of experimentation.

Figure 2:
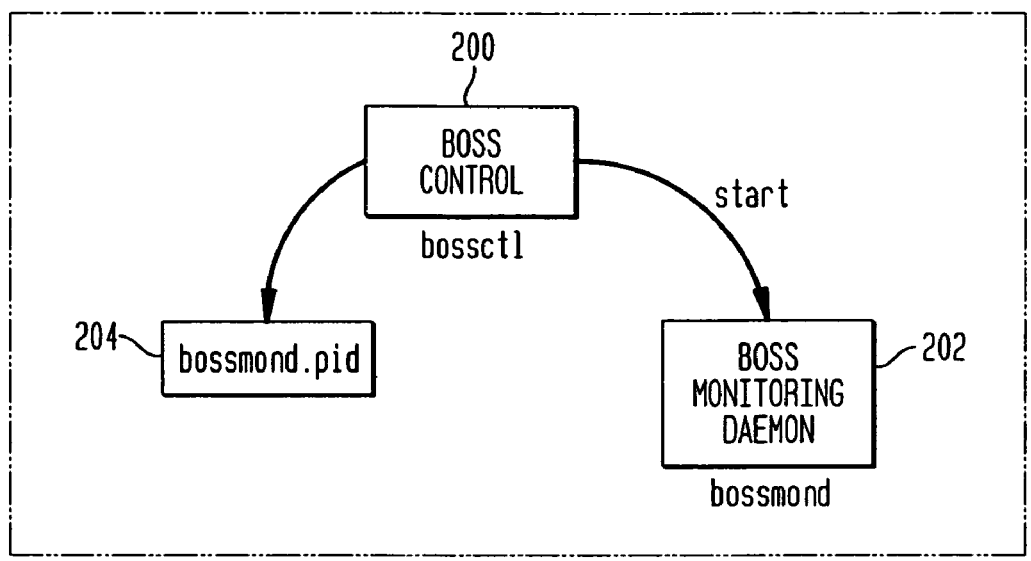
FIG. 2 is a block diagram depicting the bossctl start process of an embodiment according to the invention.

On the server side, for startup of the liaison 122, the BOSS server tool should preferably have root access on the server ("BOSS server") generating the BOSS tools. FIG. 2 is a block diagram depicting the BOSS tools start process.

In FIG. 2, the BOSS server control application 200 entitled, bossctl, can launch the BOSS monitoring daemon 202, bossmond, and can save the daemon child process identification (PID) number in the bossmond.pid file 202. The purpose of the bossctl application 200 can be to start, stop, restart, or idle the BOSS server. Thus, to start the BOSS server tools, one can type the following command (where the greater—than (">") represents the prompt of the operating system):

>bossctl start

The bossctl stop option can terminate all BOSS server processes and related child processes gracefully, and can shut down the BOSS tools. The restart option can gracefully allow a graceful restart of the BOSS tools after an unexpected service disruption. This restart can cause the BOSS server tool to update all its files and reconnect users, if it can, and deal with any unwanted garbage.

The idle option can cause the BOSS tools to run in an idle state, disallowing any connections and informing clients that the tool is down or under maintenance. If connections exist prior to the execution of an idle option, the BOSS tools can gracefully terminate the connections informing each client in the process.

Figure 3:
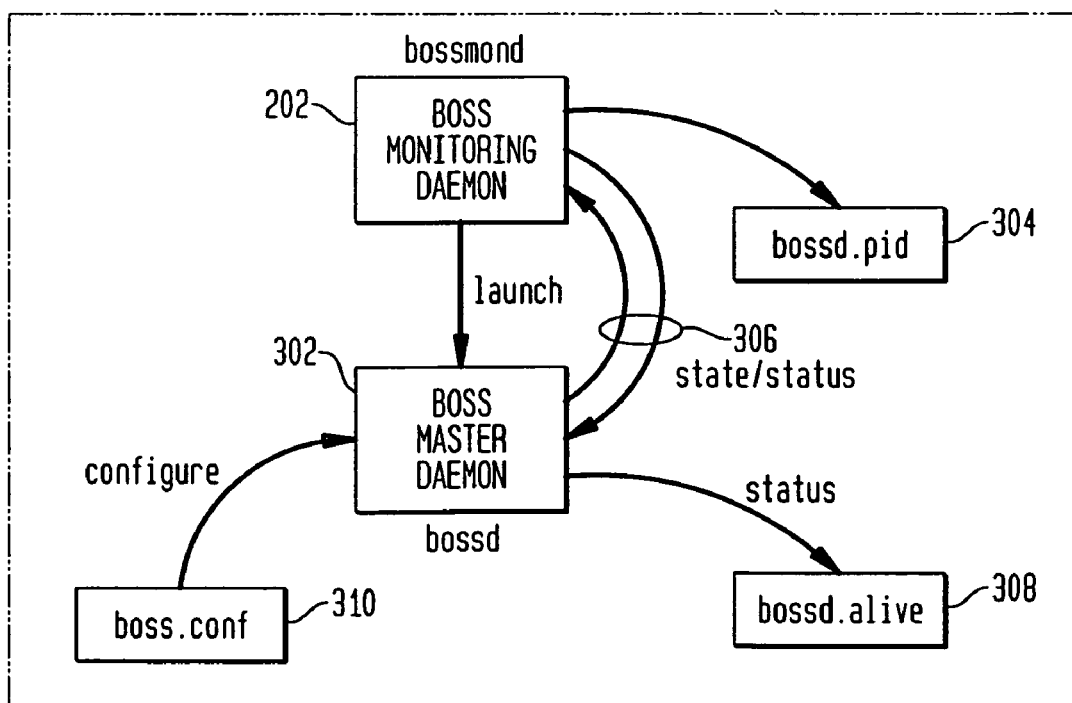
FIG. 3 is a block diagram depicting the startup and operation of the BOSS monitoring daemon (bossmond) process of an embodiment according to the invention.

FIG. 3 is a block diagram depicting the startup and operation of the BOSS monitoring daemon (bossmond) 202. Once the BOSS monitoring daemon (bossmond) 202 is launched, it can create a master BOSS daemon 302 (bossd) as a child process, and save the daemon child process identification (PID) number in the bossd.pid file 304. The bossmond daemon 202 can then go into a monitoring state in which it can continuously check the status of the bossd daemon 302 by communicating with the master BOSS daemon 302 (bossd), ensuring the process is still alive and functional.

All communication 306 between the bossmond daemon 202 and the bossd daemon 302 can be continuously logged in the bossd.alive file 308, with time stamps. Tailing the bossd.alive file 308 can be a good way to monitor both the bossd daemon 302 and the bossmond daemon 202 activities.

If the bossd daemon 302 is not responsive to the bossmond daemon 202, the bossmond daemon 202 can email the BOSS server administrator. The BOSS server administrator email address can be kept in the BOSS server tool configuration file 310, boss.conf.

The BOSS server tool configuration file 310 can contain the information required to configure the operational characteristics of the bossd daemon 302. Information such as the MSC, OMP server, IP address, port numbers, number of users per port, etc. can all be contained within the configuration file 310. The configuration file 310 can also be used by all BOSS daemons and applications The configuration file 310 identifies the port to which the master BOSS daemon 302 is to listen. The master BOSS daemon 302 bossd, once launched, can simply listen to its assigned port and takes actions depending upon requests initiated by BOSS clients (to be discussed below), e.g., the client 106. Therefore, until a BOSS client communicates with the bossd daemon 302, nothing really happens. The bossd daemon 302 process can remain idle indefinitely. When a request from a BOSS client is actually received, the bossd daemon 302 can then process the request and take the appropriate actions (to be discussed below), if any. A request from a client initially takes the form of a request for an SDP port.

When a BOSS client request is received from a client, the bossd daemon 302 can acknowledge the request and can immediately assign a port and an associated already-existing handler daemon with which the client can communicate. Or the bossd daemon 302 can spawn a new handler daemon for the client with a new port number, if all existing handlers have already reached the maximum amount of allowable clients.

To ensure speed in the multiplexing of SDP screens, since client requests are handled in a First-In-First-Out bases (FIFO), the bossd daemon 302 can launch a handler daemon for each preset number of BOSS clients according to the configuration file 310. In this manner all clients can be served in a true UNIX, concurrent manner, as opposed to in a sequential method. Although multi-tasking in the UNIX environment does not guarantee faster results, with a faster machine having sufficient memory, a significant difference can be noted, especially when more than one CPU of the server is involved.

The total number of clients a handler can accept can be determined by bossd daemon 302. When the bossd daemon 302 is created, it can initially load the boss.conf file 310, which amongst other parameters can contain the maximum amount of allowable clients per each handler created by the bossd daemon 302. When a new handler is launched, the bossd daemon 302 can configure the handler accordingly, telling it, amongst other things, the maximum number of clients it is permitted to serve. Once a handler has reached its maximum amount of allowable clients, the bossd daemon 302 can create a new handler for any new client requests, unless the maximum amount of handlers allowed to run concurrently has been reached. The maximum amount of concurrent handlers that the bossd daemon 032 can create can be limited to what is defined in the boss.conf file 310.

To restate, each handler should only serve up to a certain number of clients and no more, and all handlers should be managed by the bossd daemon 302. Also, each handler should have its own assigned port, so that only the handler and its respective clients should be communicating through this port to, in effect minimize traffic.

Figure 4:
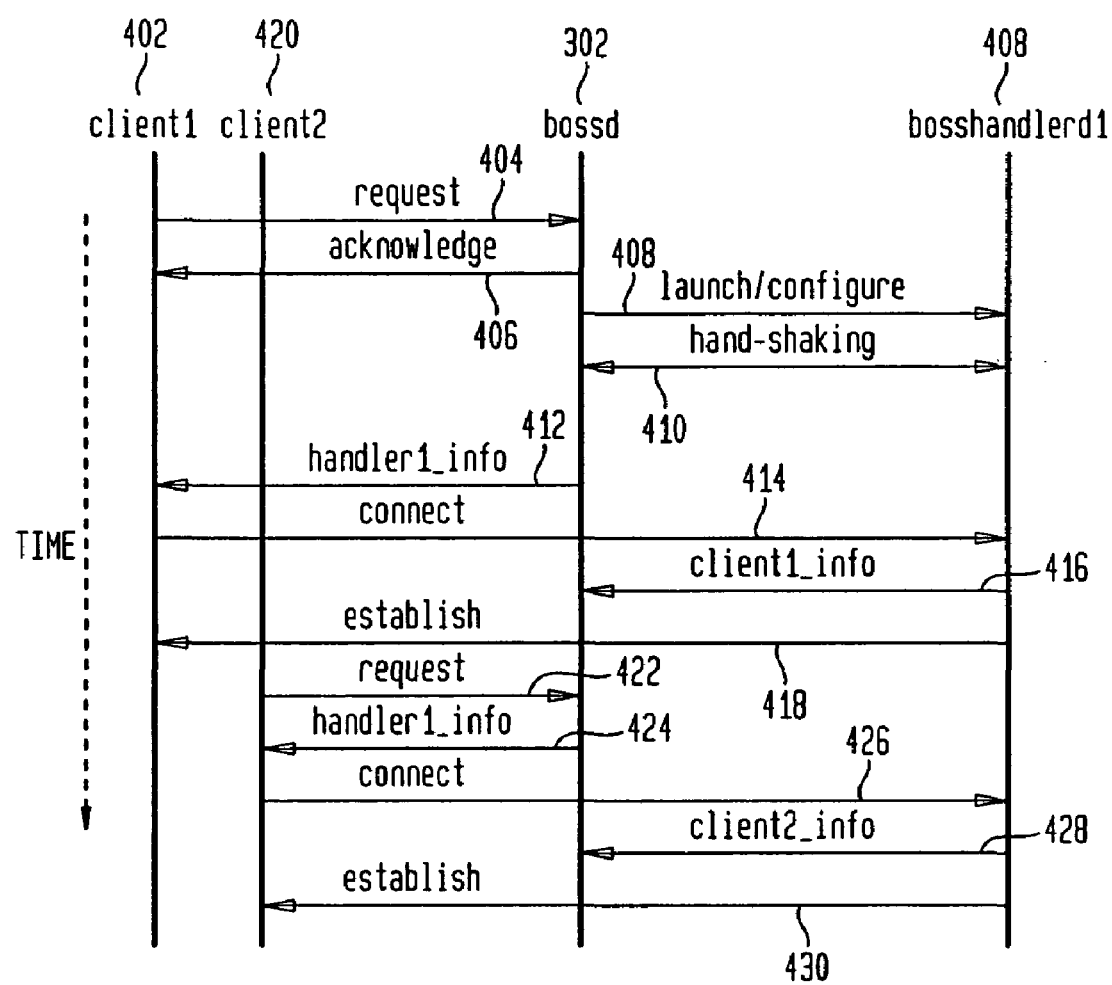
FIGS. 4–5 are Unified Modeling Diagrams (a type of high level sequence diagram) depicting interactions of the bossd daemon with a BOSS client of an embodiment according to the invention, in terms of specific examples.
Figure 5:
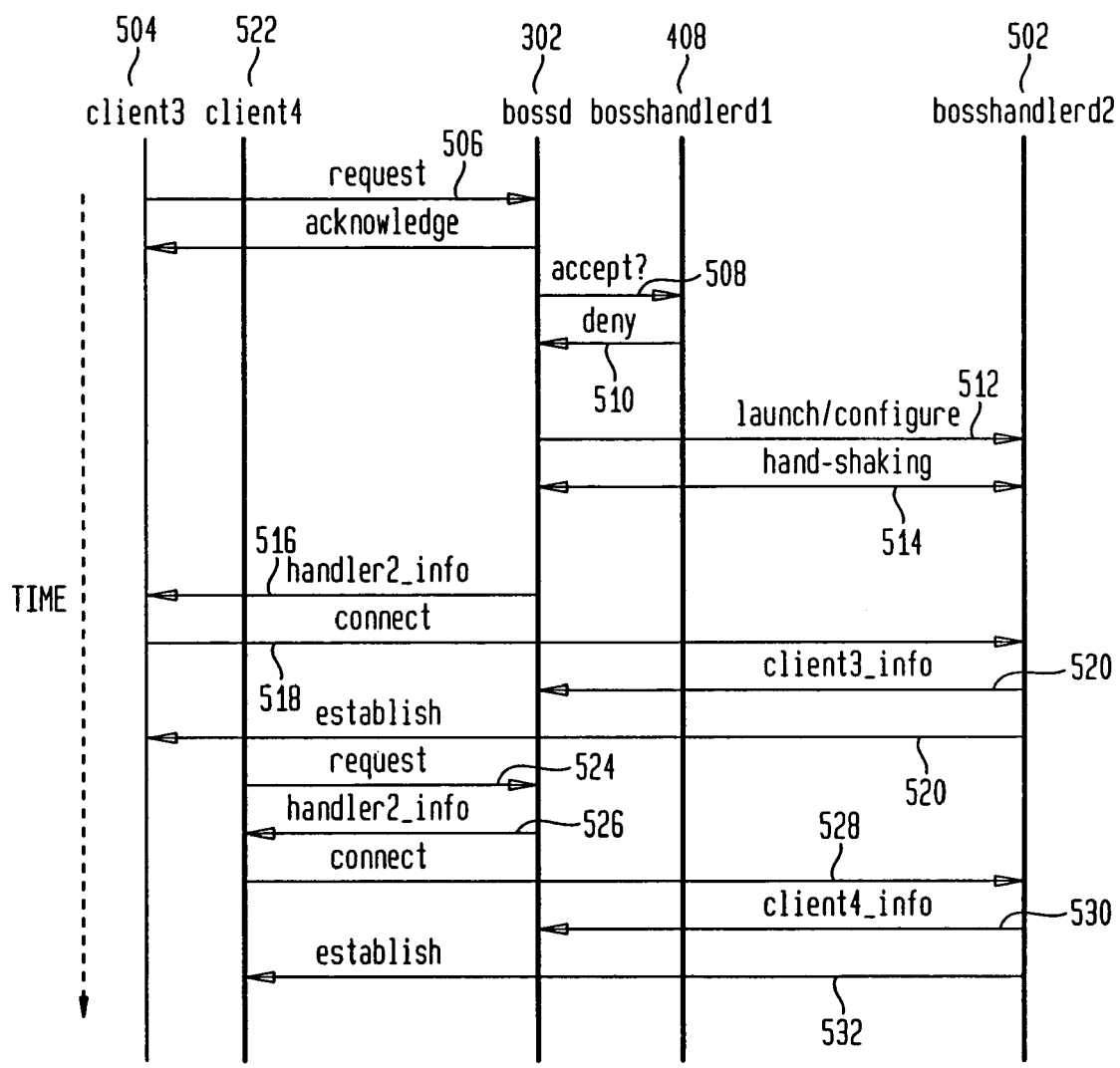

Typical interactions of the bossd daemon 302 with a BOSS client are depicted in the Unified Modeling Diagrams (a type of high level sequence diagram) of FIGS. 4–5. For simplicity, FIG. 4 is presented in terms of a specific example. In the example of FIG. 4, the bossd daemon 302 has just been launched and no client/handler relationships exist. In the example of FIG. 5, a new client request is received and an already existing handler has reached its maximum amount of allowable clients.

In FIG. 4, client1 (402) initiates a request 404 to the bossd daemon 302. It is assumed that no handlers for clients exist at this point. Accordingly the bossd daemon 302 can acknowledge (406) the request, e.g., by telling client1 402 to standby. At this point, the bossd daemon 302 launches the first handler daemon 408, called bosshandler1 configuring it according to the configuration file 310. Once bosshandler1 daemon 408 has been configured and is confirmed to be properly working through an exchange of information (handshaking) 410 between the bossd daemon 302 and the bosshandler1 daemon 408, then the bossd daemon 302 can send 412 the bosshandler1 daemon 408 information (including the number of the port to be used for communication) to client1.

Upon receipt of the information about the handler to which client1 402 has been assigned, client1 402 can then attempt to initiate a connection 414 with the bosshandler1 daemon 408. If everything goes well, the bosshandler1 daemon 408 can then acknowledge (not depicted) the connection, inform 416 the bossd daemon 302 about the new client it is handling, and establish 418 a connection with client1 402, in essence allowing client1 402 to share an SDP port.

To take the example one step further, a second client 420, called client2, then makes a request 422 to the bossd daemon 302 some time later. For simplicity, in this example, it will be assumed that the bosshandler1 daemon 408 has been configured by the bossd daemon 302 to handle a maximum of two clients. Thus, the bossd daemon 302 can then immediately acknowledge 424 the request by returning information about the bosshandler1 daemon 408 to client2 420. Assigning clients to handlers in this manner can be referred to as the fill mode.

An alternative mode of assignment is to assign the one client per handler until the maximum number of handlers has been generated, at which point a second client is added to each handler until all the handlers have a second client, etc. The latter mode can be referred to as the least mode. The fill mode imposes a smaller load on the monitoring system, but it can force clients to wait longer for the results of their requests. In contrast, the least mode provides a generally quicker response to clients but imposes a greater load on the monitoring system.

Client2 420, like client1 402 had done, can then connect 426 to the bosshandler1 daemon 408. The handler, bosshandler1 daemon 408, can then inform 428 the bossd daemon 302 about the new client it is handling, and establish 430 a connection with client2 420, in essence allowing client2 420 to share the SDP port that client1 402 already shares. The bosshandler1 daemon 408 can also inform 428 the bossd daemon 302 that it has reached its maximum amount of allowable clients.

The bosshandler1 daemon 408 can queue/buffer SDP page requests from client1 402 and client2 420 in a FIFO manner and can sequentially send each request to the SDP interface. Each such request from a client includes, among other things, the client identifier. When the requested page is returned to the bosshandler1 daemon 408, it has remembered the client identifier so that it can pass the received page to the proper client.

At this point in the example, there are two clients (client1 402 and client2 420) sharing the same SDP port by way of the bosshandler1 daemon 408. In the continuation of the example depicted in FIG. 5, a third client request can cause a different response from the bossd daemon 302 since all the existing handlers (at this point in our scenario, one) have reached their maximum amount of allowable clients. Unless the maximum amount of allowable handlers has been reached, the actions in FIG. 5 can apply regardless of how many handlers are running concurrently.

In FIG. 5, client3 504 initiates a request 506 to the bossd daemon 302. Since, at this point in the example, one or more handlers already exist, the bossd daemon 302 can poll 508 each handler to determine if any can serve a new client (via the response 510, which in FIG. 4 is labeled "deny"). This polling process, although depicted in the above diagram as communication 508 between the bossd daemon 302 and the bosshandler1 daemon 408, also entails a search through data the bossd daemon 302 has already accumulated over time on all its handlers.

Also, when a handler accepts a new client, that client information and the state of the handler can be written to a database file (not depicted) called bosshandlers.db, by such handler. Therefore, upon the receipt of a new request from a client, the bossd daemon 302 can also consult this data if there is some discrepancy, compare it with its own data, and then communicate with the handler to conclude a result, if needed.

Stepping away from the example briefly, a similar process occurs when a client terminates its session with a handler. At such a point, the handler updates the information in the bosshandlers.db file (not depicted), and communicates its state to the bossd daemon 302. Therefore if a new client request arrives, the bossd daemon 302 can assign the new client to an already existing handler which has lost a client.

Returning to the example, if after polling all of its handlers the bossd daemon 302 determines that none of its handlers has the capacity for additional clients, the bossd daemon 302 can launch 512 another handler, the bosshandler2 daemon 502, if the maximum amount of handlers has not been reached. From this point forward the processes 516, 518 and 520, and hand-shaking 514 which occur can be exactly the same as those depicted in FIG. 4 (and so are not discussed in detail), ultimately resulting in the bosshandler2 daemon 502 establishing 520 a connection to the client3 504 that involves the sharing of a port assigned to the bosshandler2 daemon 502. Similarly, client4 522 can initiate a connection with the bosshandler2 daemon 502 via, among other things, the processes 524, 526, 528 and 530, ultimately resulting in the bosshandler2 daemon 502 establishing 532 a connection to the client4 522 that involves the sharing (along with client3 504) of the port assigned to the bosshandler2 daemon 502.

In the example, therefore, a fifth client would cause the bossd daemon 302 to launch another handler.

To track and keep a record of all its handlers, the bossd daemon 302 can create a database file (not depicted) called bossd.db, in which it keeps records on all its handlers, including PID, current state, etc. Also, if a handler stops communicating with the bossd daemon 302, the bossd daemon 302 can conclude that the handler is in an unknown state, can destroy the handler, can notify all of its clients accordingly, and can update the bossd.db file.

Before discussing the client side perspective, the process to actually stop, or shutdown, the BOSS server will be explained. Again, as mentioned above, one should be at the root to stop the BOSS server, or perform any of the above processes for that matter.

As mentioned above, the BOSS server control application entitled, bossctl, can launch the BOSS monitoring daemon 202, bossmond. The bossctl application 200 can also be used to stop and shutdown all BOSS server activity. But this should not be done without caution. Terminating SDP ports for many users can cause great aggravation if the reason for the termination is not convincing!

To shutdown the BOSS server, the following command can be executed:

>bossctl stop

The execution of this command can cause the bossmond daemon 202 to send a shutdown message to the bossd daemon 302. The bossd daemon 302 can then start to terminate all BOSS server handlers gracefully, by first sending a terminate message to each handler. Once all the handlers have closed their connections with their clients, each handler can then notify the bossd daemon 302 of its state. The bossd daemon 302 can then destroy each handler accordingly. Once no more handlers exist, the bossmond daemon 202 can be informed by the bossd daemon 302 that no more handler/client relationships exist, and that it is now safe to shutdown the BOSS server tool. The bossd daemon 302 can then terminate itself.

Upon receipt of a successful shutdown message from the bossd daemon 302, the bossmond daemon 202 can then terminate itself also. If a successful shutdown message is not received from the bossd daemon 302 within an acceptable period of time, the bossmond daemon 202 can then force a shutdown, destroying the master daemon, if it can. Prior to its end it can email the BOSS administrator of the shutdown status.

Prior to its own termination, the bossmond daemon 202 can notify the bossctl application, which has been remaining idle the entire time and waiting for a final response, that the BOSS server has been successfully shutdown. The bossctl application can then terminate. If a successful shutdown message is not received from the bossmond daemon 202 within an acceptable period of time, the bossctl can also force a shutdown, destroying the monitoring and master daemons.

To begin with, a BOSS client can do nothing if the BOSS server has been shutdown. To be more accurate, the client application would respond to the user with a message

BOSS SERVER NOT RESPONDING if an attempt is made to establish a connection while the BOSS server cannot be reached. Such a message can mean anything. Since a client cannot communicate with the bossd daemon 302, it could be a port problem, network problem, or BOSS server tool problem, or shutdown problem, and the client would not know because it cannot communicate. However, if the BOSS server can communicate, and the BOSS server is running in an idle state, the following message can be returned to the user:

BOSS SERVER IDLE: <message> where <message> can be a BOSS server administrator message that explains to the users why the BOSS server has been put into an idle state. Another message which may be returned is the message stating that no more ports are available, as follows:

BOSS SERVER PORT

ACCESS DENIAL: no more ports available.

At this point the BOSS server administrator can either increase the number of clients each handler can serve, e.g., by editing the boss.conf file and restarting the BOSS server.

The BOSS client end application (not depicted), simply called boss, can be executed by a user sitting at any networked workstation, e.g. the client 106, which can be on the same network as the BOSS server, or at least be able to access the subnet. Being on the same network will achieve a faster response. To start a BOSS client, the following command can be executed:

>boss 7

The argument passed to the client application can tell the client application which BOSS server the user will be attempting to communicate with. The value of the argument can be any string or number as long as the client application can resolve the value by referencing it's bossServers file (not depicted), e.g., located in the user's home directory. Once the client application has been executed, until the program is terminated by the user, it can remain in either an idle or interactive state.

Figure 6:
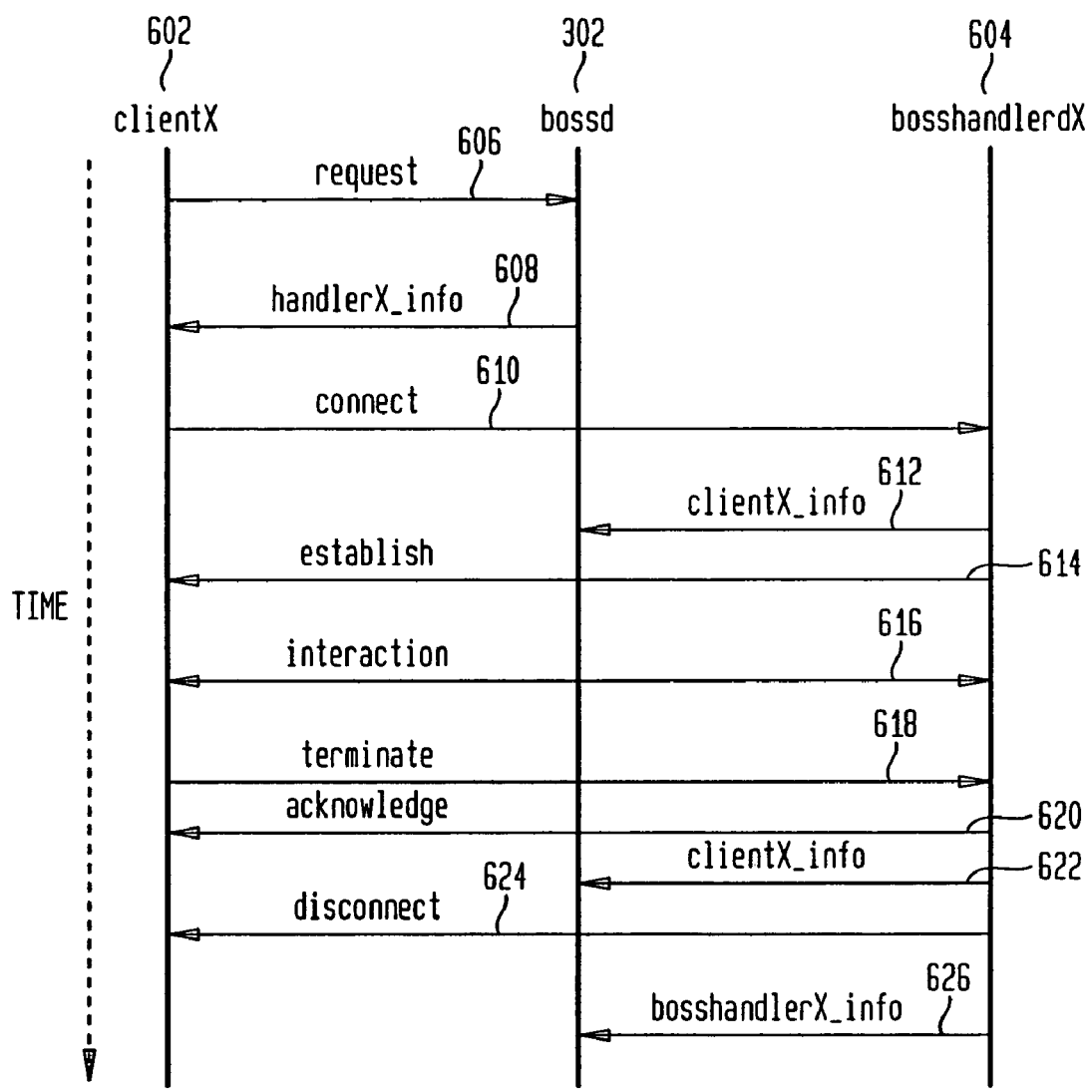
FIG. 6 is another Unified Modeling Diagram depicting interactions of the bossd daemon with a BOSS client of an embodiment according to the invention, in terms of specific examples.

To communicate to a BOSS handler, the client application the boss first initiates a request. FIG. 6 is a Unified Modeling Diagram depicting interactions of the bossd daemon with a BOSS client of an embodiment according to the invention, in terms of specific examples. To simplify the sequence of actions, depiction of the creation of the handler on the server side (which is explained above) has been omitted.

As was similarly depicted FIGS. 4–5, the client first initiates a request 606. For our purposes here this can be client number X, referred to as clientX (602). A BOSS handler daemon 604, bosshandlerX, can be assigned to clientX 602 (as reflected by the communication 608, and clientX 602 can then attempt 610 to establish communication with the bosshandlerX daemon 604.

Upon a successful connection, the bosshandlerX daemon 604 can then update 612 the bossd daemon 302 (as described above) with client information, and then establish 614 an interactive connection with clientX 602. From this point forward the handler and client communicate undisturbed, with the bosshandlerX multiplexing the SDP pages as needed amongst clientX 602 and its other clients (not depicted in FIG. 6).

During this interactive session between a handler and its client applications, the client applications can be doing more than obtaining the requested SDP pages. The client applications can also simultaneously be keeping track of and learning about their users. Information such as the user, the user's priority level, the current SDP page, its cell and components such as DCCH for example, the connectivity state and current method, the date, inactivity and average delays, can be recorded and updated continuously as long as the interactive session continues. Therefore, the client applications can be learning about their users.

In this manner, in case of any disruptions of service, the bossd daemon 302 can re-create its handlers, each of which can then attempt to re-create, or establish, its communication with its clients, by requesting information from former clients. This can facilitate the return to the state of communication in effect before the disruption. This continual collection of data on each user can be continually written to a corresponding client database (not depicted) called, bossclient.db, in the user's home directory. If a client application disconnects from a handler, willingly, then the data corresponding to its user can be removed from the home directory freeing up disk space.

A handler/client interactive session can continue indefinitely, until the client decides to terminate the connection. At this point, the handler bosshandlerX can acknowledge the request to terminate, putting clientX 602 into a standby mode, update the bossd daemon 302 with new clientX 602 information, clean up its database records on clientX 602, and disconnect clientX 602. The clientX 602 application can then terminate.

If the bosshandlerX 604 is still serving additional clients, then it can continue to dish out SDP pages and keep track of its clients. If clientX 602 was the last client of the bosshandlerX, then as shown in FIG. 6, after their interaction 616 is completed and the clientX 602 can terminate 618 its session with the bosshandlerX 604, which can be followed by an acknowledgement 620 from the bosshandlerX 604. Then, the bosshandlerX 604 can inform 622 the bossd daemon 302 that it no longer has any more clients while also deleting 626 its database of clients, and also disconnect 624 from clientX 602. At such a point (not depicted in FIG. 6), the bossd daemon 302 can update its records on the bosshandlerX, meaning information on the bosshandlerX can be removed from the bosshandlers.db and bossd.db databases, and then can destroy the bosshandlerX, in essence freeing up a slot for another handler.

Within the example of the BOSS tools implementation described above, an example of a communication protocol between the client and the BOSS tools will be presented. Again, the BOSS master daemon, bossd 302, can be the main server application which assigns new clients to BOSS handlers 408 and 502, and creates new handlers when needed. The bossd daemon 302 can be a continuously running program which simply waits for client requests and then redirects them to their assigned handler 408 or 502.

An explanation of the BOSS server messages syntax and format is as follows. All messages between daemons can have three parts, and can have the following syntax:

sending_daemon-
>receiving_daemon|message|appended_data| . . .

The first part of the message can exist as a way of deciphering from which daemon the message originated. It should be the name of the sending daemon separated by a right arrow followed by the name of the daemon to which the message had been sent. Each message part can be terminated with a pipe symbol, e.g., | or :.

The second part can be the actual message, or command, and again can be terminated with a pipe symbol. Therefore the START_LOG message stated above would have been sent as follows:

bossmond-
>bossd|START_LOG|boss1.wh.lucent.com|EOT

Comparing the above START_LOG message to the syntax explained above, it can be observed that the third part of the message is missing, meaning the appended data part. It can also be observed that the server name and EOT characters, separated by the pipe symbol, have been tacked on to the end of the message. This is because the START_LOG message preferably does not send data to the bossd daemon. It can simply be a command instructing the bossd daemon 302 to initiate the logging of all BOSS server activity. Had this been a message which transferred data, the third part of the message would have had appended data. If there is more than one data string multiple parts of data information would be appended onto the message, with each string of data terminating in a pipe symbol.

The server name and EOT characters, separated by the pipe symbol, should be tacked on to the end of each message, as a way of confirming the origin of the message, and to signal the end of the transmission (EOT).

When the bossd daemon 302 is launched by the BOSS monitoring deamon bossmond 202, the bossd daemon 302 can immediately load the BOSS server configuration file boss.conf. If the configuration file cannot be located, or a syntax error exists in the file, or an invalid value has been assigned to a configuration variable, bossd should abort its execution immediately.

To ensure the daemon has been launched correctly, the bossd daemon 302 verifies that the bossmond daemon 202 is running in parallel, otherwise it should abort execution. This initial check for the bossmond daemon 202 ensures that the master daemon 302 does not run in a non-monitoring state. Since the BOSS monitoring daemon 202, bossmond, is responsible for shutting done the BOSS server by sending the message bossmond->bossd:SHUTDOWN:

where the colon (:) represents a pipe symbol, to the bossd daemon 302 (ensuring the proper shutdown and clean-up of all handlers), running bossd daemon 302 without the use of the startup tool 202 bossctl which launches the bossmond daemon 202 may leave runaway processes on the BOSS server.

Figure 7:
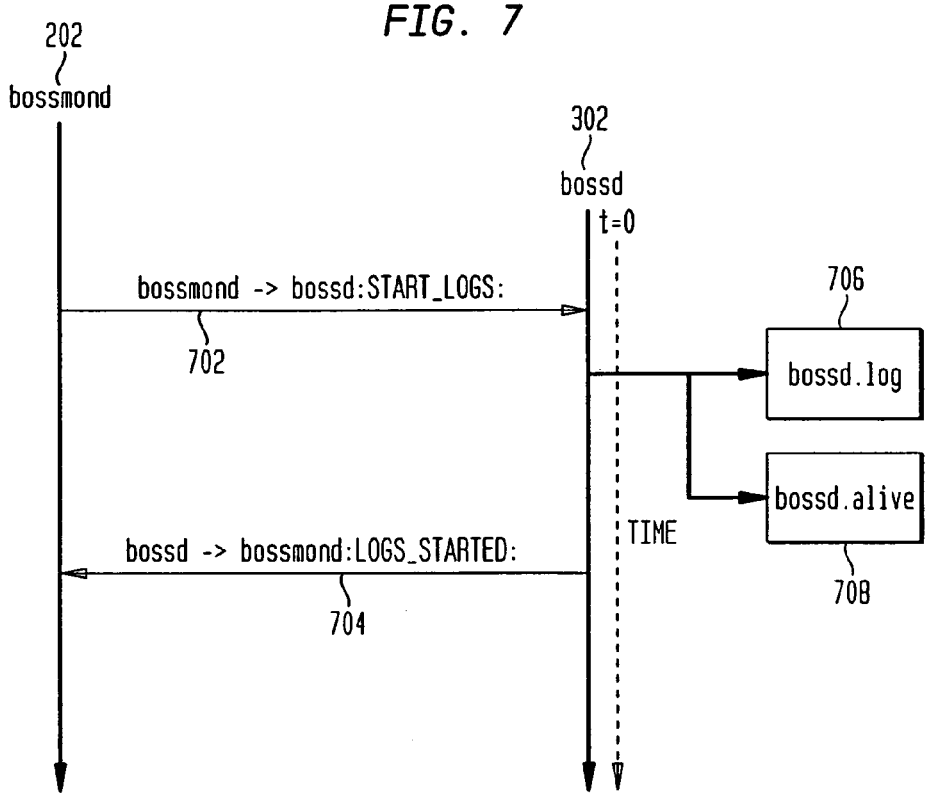
FIG. 7 as a depiction of a combination sequence and flow diagram which illustrates the interactions between the bossmond and bossd daemons upon the initial startup of the BOSS server master daemon bossd according to an embodiment of the invention.

If both daemons 202 and 302 are running in parallel, the bossd daemon 302 can then wait a courtesy time for the bossmond->bossd:START_LOGS: message (see 702 FIG. 7) from the bossmond daemon 302, which instructs the bossd daemon 302 to create the BOSS server files bossd.log (see 706 FIG. 7) and bossd.alive (see 704 FIG. 7).

Upon receipt of the bossmond->bossd:START_LOGS: message, the bossd daemon 302 can immediately create the server logs and can respond to the bossmond daemon 202 with the following message (see 704 FIG. 7):

bossd->bossmond:LOGS_STARTED:

The location of the master BOSS server log, bossd.log, can be defined by the bossLogs: configuration variable. The master BOSS server log can contain all messages between bossd, bossmond, and all its handlers and clients, all time stamped. It can be an all inclusive file. This file can exist as a way of tracking all BOSS server activity between all its daemons, clients, and handlers. Tailing this file can be a good method in monitoring the entire BOSS server activity.

The location of the BOSS server bossd.alive file, can be defined by the bossDatabase: configuration variable. This log can exist as a way of monitoring activity between the bossmond daemon 202 and the bossd daemon 302, and can log all messages exchanged between the daemons. Tailing this file can be a good method in monitoring the handshaking between these daemons. The bossd.log and bossd.alive files would typically only be created by the bossd daemon 302.

Once the bossd daemon 302 has responded with the bossd->bossmond:LOGS_STARTED: message, it can then go into an idle state in which it can simply wait port requests from new clients, or instructions from the bossmond daemon 202.

Once the bossd daemon 302 has responded with the bossd->bossmond:LOGS_STARTED: message, it can then go into an idle state in which it can simply wait for port requests from new clients, or instructions from the bossmond 202.

Figure 8:
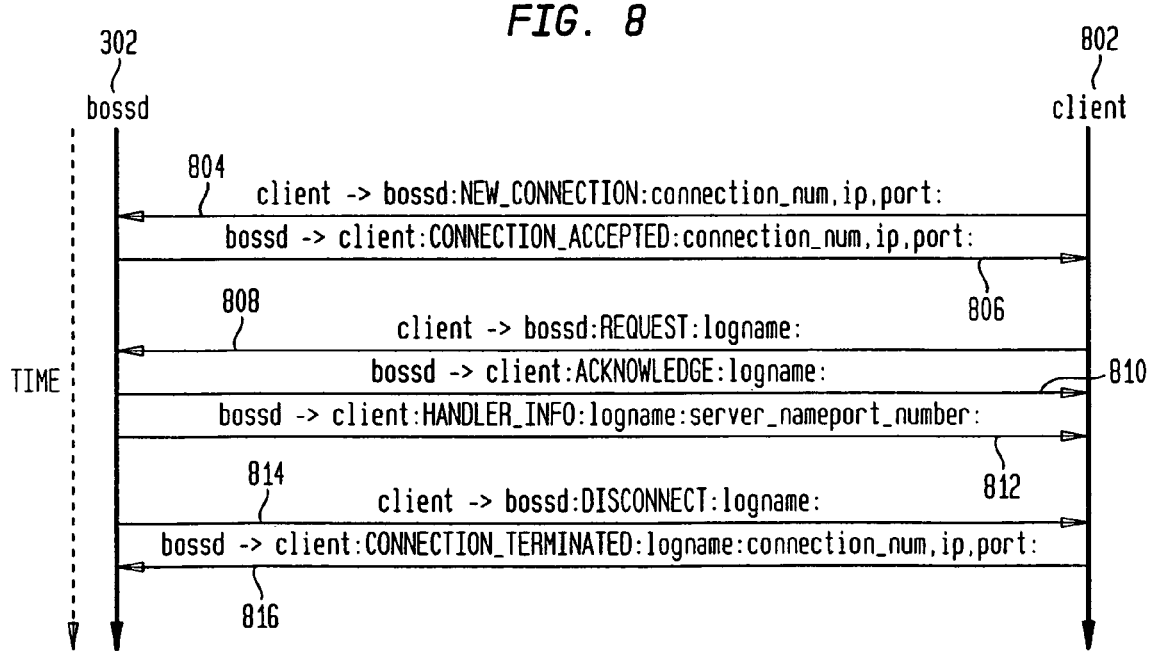
FIG. 8 depicts a Unified Modeling diagram which illustrates the interactions between the bossd daemon and a new client request for an SDP port according to an embodiment of the invention.

FIG. 8 depicts a Unified Modeling diagram which illustrates the interactions between the bossd daemon 302 and a new client request for an SDP port and the assignment of a handler to the new client. In FIG. 8, client 802 can correspond to any of clients 104, 140, 142, client 1 402, client 2 420, client3 504, client4 522 and clientX 602.

After its initial startup, the bossd daemon 302 can remain idle waiting for client requests for SDP ports. To request an SDP port assignment from the BOSS server, a client should first connect to the bossd daemon 302. Upon an initial connection the following message can be logged in the bossd.log file (see 804 FIG. 8):

client->bossd:NEW_CONNECTION:connection_num, ip,port:

The connection_num is the client socket connection identification, ip is the IP address of the connection, and port is the server port number assigned. Upon establishing the connection, the bossd daemon 302 can send the following message back to the client, and also can log the message in the bossd.log file (see 806 FIG. 8):

bossd->client:CONNECTION_ACCEPTED: connection_num,ip,port:

From this point forward, the connection between the bossd daemon 302 and the new client can remain active until either the bossd daemon 302 terminates the connection, or the client sends the following disconnect message to the bossd daemon 302 (see 814 FIG. 8):

client->bossd:DISCONNECT:logname:

It should be observed that the client disconnect message can include appended data. The appended data can be the client's login name.

This appended data can be echoed back by the BOSS server to the client as confirmation that the BOSS server has in fact received its disconnect message. For example, if the client's login name was jenny, then the BOSS server would echo back the following message to the client, and then close the connection (see 816 FIG. 8):

bossd->client:CONNECTION_TERMINATED:jenny:
        connection_num, ip, port:

It should be observed that the original connection data can also been appended to the termination message returned by bossd.

Once connected, to request a port, a client should first send the following message to the bossd daemon 302 (see 808 FIG. 8):

client->bossd:REQUEST:logname:

The bossd daemon 302 can then immediately respond with an acknowledgement message, which can basically tell the client to standby and wait until the server can determine if a handler is available. For the purpose of documentation, the acknowledgement message can be as follows (see 810 FIG. 8):

bossd->client:ACKNOWLEDGE:logname:

If a handler is available, the handler server name and port number can be sent to the client as follows (see 812 FIG. 8):

bossd->client:HANDLER_INFO:logname:
        server_name port_number:

The variable server_name is the name of the server on which the handler is running (always the same server as the BOSS server), and port_number is the server port number to which the client should connect to acquire its SDP port. There are at least two reasons why the server name is returned here as part of the handler information, as opposed to just a port number. The first reason is to allow the data to be confirmed by the client. The second reason is for expandability purposes, in case future expansion of the tool requires a BOSS server with handlers on more the one server.

If no more handlers are available, meaning the client cannot be assigned a handler because all existing handlers have reached their maximum amount of allowable clients, and the maximum amount of handers allowed to run concurrently has been reached, then the bossd daemon 302 can return the following message to the client:

bossd->client:HANDLER_INFO:logname:
        MAXIMUM_HANDLERS_REACHED:

If an error occurs in the assignment of a handler to a client, the bossd daemon 302 can return the error message to the client.

If no handlers exist when a client request arrives, or all existing handlers have reached their maximum amount of allowable clients, the bossd daemon 302 can create a new handler (if the maximum amount of allowable handlers has not been reached). The bossd daemon 302 can then save this handler information in the bossd.db file (not depicted), e.g., located in a directory defined by the bossDatabase: configuration variable. This file can contain one entry per existing handler. Each entry contain the handler PID, port number, and current state. Upon its initial launch, the keyword LAUNCHED can be stored as its current state.

Thus, the invention does not disturb the existing monitoring system and yet achieves a desired goal of, in effect, adding more ports without reconfiguring or adapting the hardware of the monitoring system.

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A port-sharing system comprising:
    a computing resource having a port;
    a monitoring interface to said computing resource available via said port;
    a plurality of end user devices to be connected to said monitoring interface; and
    a liaison interface to handle communications from said plurality of end user devices that are intended for said monitoring interface and to handle communications from said monitoring interface that correspond to said communications from said end user devices, respectively.

2. The system of claim 1, wherein:
    said port is a first port;
    said liaison interface has a second port;
    said liaison interface is operable to connect to each of said plurality of end user devices via said second port while being connected to said computing resource via said first port.

3. The system of claim 2, wherein said liaison interface includes at least one handling daemon.

4. The system of claim 1, wherein said liaison interface is operable to give each user of one of said plurality of end user devices the impression of being directly connected to said computing resource.

5. The system of claim 4, wherein said computing resource is a mobile switching center (MSC) and said monitoring interface is a status display page (SDP) interface.

6. The system of claim 1, wherein the monitoring system is operable to retrieve information representing one or more parameters that are indicative of the operational state of the computing resource.

7. The system of claim 1, wherein said liaison interface is operable to:
    receive and queue requests from said plurality of end user devices that are intended for said computing resource;
    sequentially present the queued requests to said monitoring interface;
    receive responses from said monitoring interface that correspond to said requests; and
    present said responses to corresponding ones of said plurality of end user devices, respectively.

8. The system of claim 1, wherein:
    said computing resource has multiple ports;
    said monitoring interface is one of multiple monitoring interfaces available via said multiple ports, respectively;
    said liaison interface is one of multiple liaison interfaces corresponding to said ports, respectively;
    said plurality of end user devices is one of multiple sets of a plurality of end user devices; and
    each liaison interface is operable to handle communications from one of said sets of end user devices that are intended for said monitoring interface and communications from said monitoring interface that correspond to said requests from respective members of said one set of end user devices.

9. The system of claim 1, wherein said system includes a network that provides access to said port of said computing resource, and wherein said plurality of end user devices is operable as a terminal on said network.

10. The system of claim 1, wherein payloads contained in the communications from said monitoring interface, that respectively correspond to said communications from said end user devices, differ substantially.

11. A liaison apparatus between a plurality of end user devices and a monitoring interface for a computing resource having a port assigned to the monitoring interface, the apparatus comprising:
   a front input/output (I/O) unit to communicate with said plurality of end user devices;
   a back I/O unit to connect to said port of said computing resource; and
   a liaison unit to handle communications from said plurality of end user devices via said front I/O unit that are intended for said monitoring interface and to handle communications from said monitoring interface via said back I/O unit that correspond to said communications from said end user devices, respectively.

12. The apparatus of claim 11, wherein:
   said back I/O unit has a second port; and
   said front I/O unit is operable to connect to each of said plurality of end user devices via said second port while said back I/O unit is connected to said computing resource via said first port.

13. The apparatus of claim 11, wherein said liaison unit is operable to give each user of one of said plurality of end user devices is given the impression of being directly connected to said computing resource.

14. The apparatus of claim 11, wherein the monitoring interface is operable to retrieve information representing one or more parameters that are indicative of the operational state of the computing resource.

15. The apparatus of claim 14, wherein said computing resource is a mobile switching center (MSC) and said monitoring interface is a status display page (SDP) interface.

16. The apparatus of claim 11, wherein said back I/O unit, said front I/O unit and said liaison unit take the form of a daemon running on a network server, wherein the network is connectable to said computing resource.

17. The apparatus of claim 11, wherein payloads contained in the communications from said monitoring interface, that respectively correspond to said communications from said end user devices, differ substantially.

18. A liaison method between a plurality of end user devices and a monitoring interface for a computing resource having a port assigned to the monitoring interface, the method comprising:
   connecting to said port of said computing resource;
   connecting to said plurality of end user devices; and
   handling communications from said plurality of end user devices that are intended for said monitoring interface and handling communications from said monitoring interface that correspond to said communications from said end user devices, respectively.

19. The method of claim 18, wherein:
   said port is a first port; and
   connections to each of said plurality of end user devices are made via a second port of an intermediary processor while said intermediary processor is connected to said computing resource via said first port.

20. The method of claim 18, wherein each user of one of said plurality of end user devices is given the impression of being directly connected to said computing resource.

21. The method of claim 18, wherein the monitoring interface is operable to retrieve information representing one or more parameters that are indicative of the operational state of the computing resource.

22. The method of claim 21, wherein said computing resource is a mobile switching center (MSC) and said monitoring interface is a status display page (SDP) interface.

23. The method of claim 18, wherein said steps of connecting to said port, connecting to said plurality of end user devices and multiplexing are performed by a daemon running on a network server, wherein the network is connectable to said computing resource.

24. A computer-readable medium having embodied thereon a program to be processed by a server to cause said server to implement the method of claim 18.

25. The method of claim 18, wherein payloads contained in the communications from said monitoring interface, that respectively correspond to said communications from said end user devices, differ substantially.

* * * * *